No. 878,757.

PATENTED FEB. 11, 1908.

W. R. WHEELER.
FISHING ROD TRIMMING.
APPLICATION FILED MAY 18, 1907.

Witnesses.
Lena C. Berry.
Chas. B. Crocker.

Inventor.
William R. Wheeler
by Harry P. Williams
Atty.

UNITED STATES PATENT OFFICE.

WILLIAM R. WHEELER, OF HARTFORD, CONNECTICUT.

FISHING-ROD TRIMMING.

No. 878,757.　　　　Specification of Letters Patent.　　　　Patented Feb. 11, 1908.

Application filed May 18, 1907. Serial No. 374,340.

*To all whom it may concern:*

Be it known that I, WILLIAM R. WHEELER, a citizen of the United States, residing at Hartford, in the county of Hartford and State of Connecticut, have invented a new and useful Fishing-Rod Trimming, of which the following is a specification.

This invention relates to the trimmings which are applied to the butt of a fishing rod for the purpose of holding the reel.

The object of the invention is to arrange the reel-holding parts of such trimmings so that they will take in reel bases of various sizes and hold them positively, that is, so that there will be no danger of the reels becoming loosened and detached.

Figure 1:
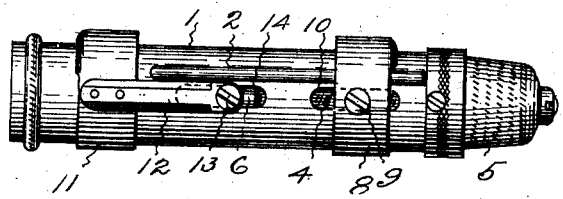
Figure 2:
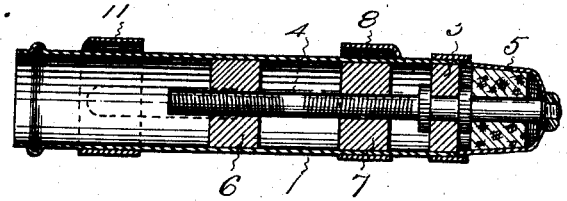
Figure 3:
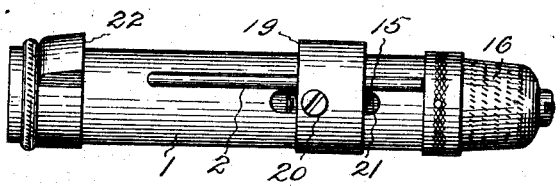
Figure 4:
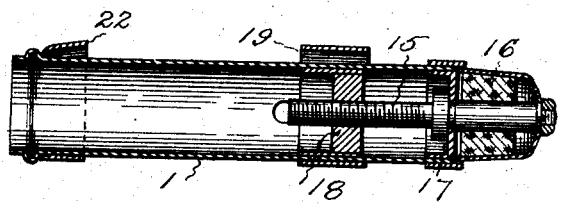
Figure 5:
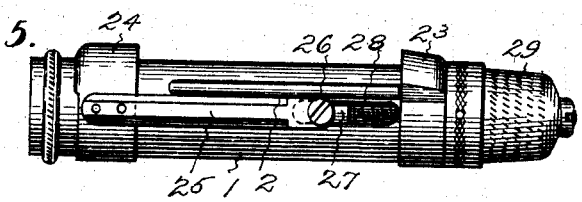
Figure 6:
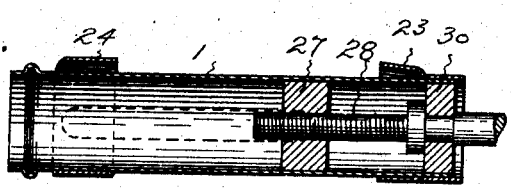

Figure 1 of the accompanying illustrations shows a side view of one form of fishing rod butt trimming that embodies the invention.
In this form both of the bands are movable positively for embracing and holding the reel flanges. Fig. 2 is a diametrical section of the same form of trimming. Fig. 3 shows a side view and Fig. 4 a section of a form of trimming in which the rear band only is movable. Fig. 5 shows a side view and Fig. 6 a section of a form of the invention in which only the front band is movable.

The shell 1 of the trimming may be formed of a piece of copper, brass, aluminium or other metal tubing, any desired length. The shell may or may not be provided with longitudinally extending ribs 2 for preventing sidewise movement of the reel flanges, and the ends may be finished with any suitable ornamentation.

Fastened in the rear end of the shell is a disk, washer or plug 3 that has a central perforation and extending through this perforation is a spindle 4. The outer end of this spindle is secured to a cap or thumb piece 5 which may be ornamented or roughened so that it may be conveniently grasped by the thumb and fingers for turning the spindle.
In the first form of the invention shown, the inner section of the spindle is provided with a right and a left thread and on these threads are nuts 6 and 7 that are threaded to correspond with the threads on the spindle. Movable on the outside near the rear end of the shell is a band 8 which by screws or studs 9, that extend through slots 10, is attached to the rear nut. Movable near the front end of the shell is a band 11 attached to which are rearwardly extending arms 12 that by screws 13, which extend through slots 14, are fastened to the forward nut. The two sides of the device are duplicates.

When the cap or thumb piece is turned the threads of the spindle engaging the threads of the nuts move the nuts longitudinally of the shell, and this of course causes both of the bands to move on the outside of the shell toward or from each other according to the way the thumb piece is turned. The cap is first turned so that the bands are separated their furthest distance, then after a reel is placed with its flanges on the shell, the thumb piece is turned so as to cause the bands to move toward each other and embrace the flanges and securely hold the reel in place. When the bands are moved up on the flanges there is no danger of the reel moving for the bands can not slip back or off from the flanges, as often happens with the ordinary loose reel holding bands.

In the second form of the invention the spindle 15, that is fastened to the cap 16 and that extends through and is held from longitudinal movement in the shell by means of the plug 17, has its inner threaded end extending through a nut 18. This nut is connected with the movable band 19 on the outside by screws 20 that pass through slot 21 in the shell. With this form of the invention the forward socket 22 for the reel flange is fixed in the usual manner to the shell, and the reel flange is first inserted under this fixed band and then the cap is turned so as to move the rear band up onto the rear flange of the reel.

In the third form of the invention the rear band 23 is fastened to or made a part of the shell and the forward band 24 is attached to arms 25 that are connected by screws 26 with a nut 27 in the interior of the shell, which nut is threaded upon the threaded portion of the spindle 28 that is attached to the thumb piece 29 and is held from longitudinal movement by a washer 30 that is fastened to the shell. In this form the rear flange of the reel is thrust into the rear fixed socket and then the thumb piece is turned so as to draw the forward band back upon the forward flange of the reel.

With this invention, which is simple to construct and easy to operate there is no danger of a reel dropping off from the rod at a critical time, or of becoming lost, as a result of the slipping of a band, for the bands can not be moved without turning the thumb pieces.

The invention claimed is:—

1. A fishing rod trimming consisting of a shell having a reel-flange socket, a band movable upon the outside of the shell toward and from the socket, a nut inside of the shell, connections extending through each side of the shell from the band to the nut, a threaded spindle extending centrally through the rear end of the shell and engaging the nut in the interior, and a cap rotatable on the rear end of the shell and attached to the spindle, substantially as specified.

2. A fishing rod trimming consisting of a shell having a reel-flange socket, and a band movable toward and from the socket upon the outside of the shell, nuts inside of the shell, connections extending through each side of the shell from the socket and band to the nuts, a threaded spindle extending centrally through the rear end of the shell and engaging the nuts in the interior, a cap rotatable on the rear end of the shell and attached to the spindle, substantially as specified.

WILLIAM R. WHEELER.

Witnesses:
HARRY R. WILLIAMS,
LENA C. BERRY.